(12) United States Patent
Vanska et al.

(10) Patent No.: US 8,098,141 B2
(45) Date of Patent: Jan. 17, 2012

(54) TOUCH SENSITIVE WEARABLE BAND APPARATUS AND METHOD

(75) Inventors: Anssi Ilmari Vanska, Helsinki (FI); Jarkko Tapio Saunamaki, Vantaa (FI)

(73) Assignee: Nokia Corporation, Espoo (FI)

( * ) Notice: Subject to any disclaimer, the term of this patent is extended or adjusted under 35 U.S.C. 154(b) by 309 days.

(21) Appl. No.: 12/395,577

(22) Filed: Feb. 27, 2009

(65) Prior Publication Data

US 2010/0219943 A1     Sep. 2, 2010

(51) Int. Cl.
  *H04B 3/36*     (2006.01)
(52) U.S. Cl. .................................. 340/407.1; 340/665
(58) Field of Classification Search ............... 340/407.1, 340/653, 654, 665, 691.1, 691.6, 691.8; 368/281; 345/173, 174
  See application file for complete search history.

(56) References Cited

U.S. PATENT DOCUMENTS

| | | | |
|---|---|---|---|
| 4,103,252 A | 7/1978 | Bobick | |
| 4,293,734 A | 10/1981 | Pepper, Jr. | |
| 4,755,634 A | 7/1988 | Pepper, Jr. | |
| 4,778,951 A | 10/1988 | Pepper, Jr. et al. | |
| 5,650,597 A | 7/1997 | Redmayne | |
| 5,861,583 A | 1/1999 | Schediwy et al. | |
| 6,239,389 B1 | 5/2001 | Allen et al. | |
| 6,297,811 B1 | 10/2001 | Kent et al. | |
| 6,619,835 B2 * | 9/2003 | Kita | 368/281 |
| 6,745,069 B2 * | 6/2004 | Nissil.ang. et al. | 600/523 |
| 7,382,139 B2 | 6/2008 | Mackey | |
| 7,439,962 B2 | 10/2008 | Reynolds et al. | |
| 7,618,260 B2 * | 11/2009 | Daniel et al. | 439/37 |
| 2001/0043514 A1 | 11/2001 | Kita | |
| 2005/0248542 A1 | 11/2005 | Sawanobori | |
| 2008/0266266 A1 | 10/2008 | Kent et al. | |
| 2009/0187121 A1 * | 7/2009 | Evans | 600/595 |
| 2011/0003665 A1 * | 1/2011 | Burton et al. | 482/9 |
| 2011/0007022 A1 * | 1/2011 | Laurent et al. | 345/174 |

FOREIGN PATENT DOCUMENTS

| WO | 0164070 A1 | 7/2001 |
|---|---|---|
| WO | 2007/141566 A2 | 12/2007 |

OTHER PUBLICATIONS

International Search Report and Written Opinion, received in corresponding Patent Cooperation Treaty Application No. PCT/IB2010/000389, May 26, 2010, 11 pages.

* cited by examiner

*Primary Examiner* — Toan N Pham

(57) ABSTRACT

In accordance with an example embodiment of the present invention, an apparatus comprises a touch sensitive wearable band having a touch sensing circuit; and an electronic device configured to receive signals generated from the touch sensing circuit to provide an indication to a user of the touch sensitive wearable band. In accordance with an another example embodiment of the present invention, a method comprises providing a touch sensitive wearable band having a touch sensing circuit; and configuring an electronic device to receive signals generated from the touch sensing circuit to provide an indication to a user of said touch sensitive wearable band.

24 Claims, 3 Drawing Sheets

TOUCH SENSITIVE WEARABLE BAND APPARATUS AND METHOD

TECHNICAL FIELD

The present application relates generally to a wearable touch-sensitive band apparatus and method and more particularly to a wearable touch sensitive band apparatus and method for performing a function.

BACKGROUND

Touch sensors, such as those found on laptop computers and personal digital assistants have grown in popularity among users in recent years. Some touch sensors can be found on displays such as those on some portable music players. Other touch sensors may be located separate from displays such as those located on some laptop computers. However, those touch sensors not co-located with a display may also function to control a display.

Users of portable electronic devices want convenience and accessibility as well as functionality. For example, arm bands have become a popular way of carrying portable music players, for example, during physical exercise. The human wrist is a convenient place to wear, for example, a watch, a calculator or even a heart rate monitor.

SUMMARY

Various aspects of the invention are set out in the claims.

According to a first aspect of the present invention, an apparatus comprises a touch sensitive wearable band having a touch sensing circuit; and an electronic device configured to receive signals generated from the touch sensing circuit to provide a function for a user of the touch sensitive wearable band.

According to a second aspect of the present invention, a method comprises providing a touch sensitive wearable band having a touch sensing circuit; and configuring an electronic device to receive signals generated from the touch sensing circuit to provide a function for a user of said touch sensitive wearable band.

According to a third aspect of the present invention, a method comprises sensing a touch using a first touch sensing circuit, the first touch sensing circuit disposed with a touch sensitive wearable band; receiving signals at an electronic device, the signals generated from the touch sensing circuit; and providing a function to a user of the touch sensitive wearable band, the function relating to the touch.

According to a forth aspect of the present invention, a method comprises sensing a touch using a touch sensing circuit, the touch sensing circuit disposed with a rim of an electronic device, the electronic device connected with a touch sensitive wearable band; receiving signals at a controller, the signals generated from the touch sensing circuit; and providing an indication to a user of said touch sensitive wearable band, the indication relating to the touch.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and its potential advantages are best understood by referring to FIGS. 1A, 1B, 1C, 1D and 2 of the drawings.

Figure 1A:
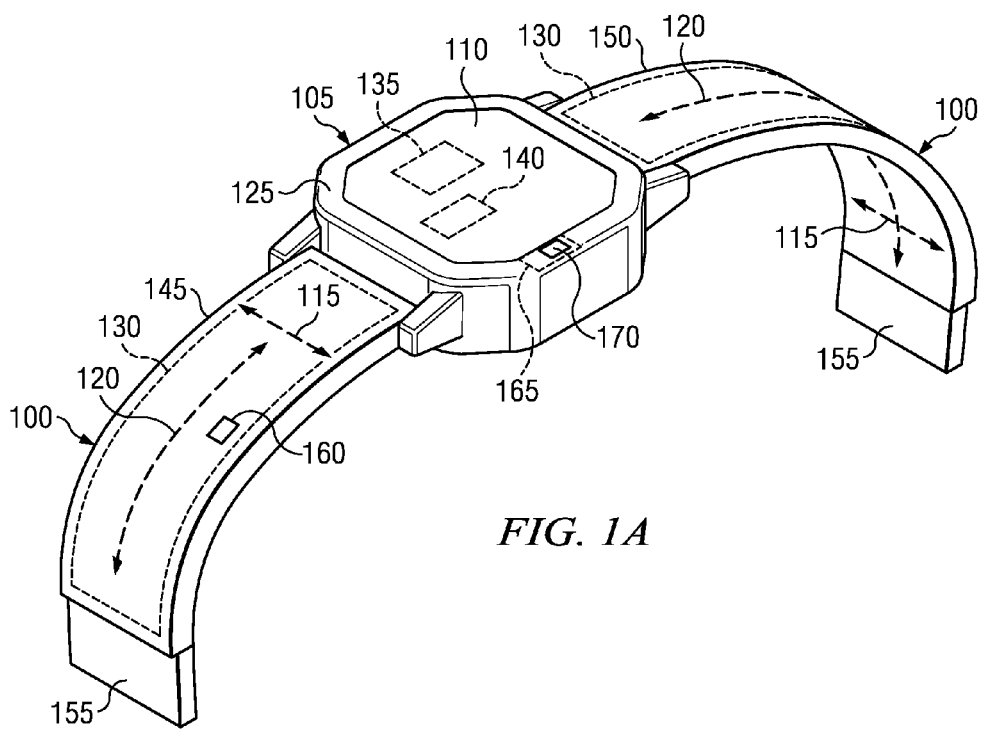
FIG. 1A schematically shows a top portion and a bottom portion of an example touch sensitive wearable band, both top portion and bottom portion are coupled with an an example electronic device.

In one embodiment, FIG. 1A schematically shows a top portion 150 and a bottom portion 145 of a touch sensitive wearable band 100. Wearable band 100 comprises an x-axis 120 and a y-axis 115. In one embodiment, both top portion 150 and bottom portion 145 of wearable band 100 may be physically and/or electrically coupled with an electronic device 105 in any manner, such as a wiring harness and/or the like. In FIG. 1A, top portion 150 and bottom portion 145 may be fastened together at fastening points 155 using any of a number of fasteners such as a clasp, clamp, buckle, button, Velcro, and/or the like.

Figure 1B:
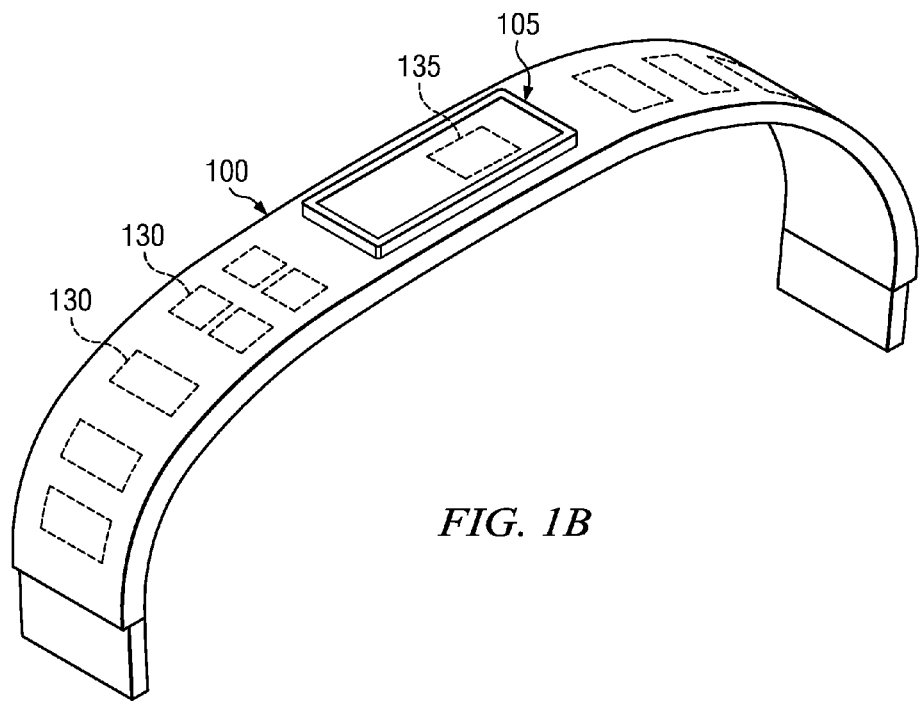
FIG. 1B schematically shows one piece touch sensitive wearable band disposed with an electronic device.

In another embodiment as shown in FIG. 1B, wearable band 100 may be configured as a single portion wherein the electronic device 105 is attached with and/or embedded within wearable band 100. In one embodiment, the ends 155 of wearable band 100 may be permanently attached with each other or wearable band 100 may be configured as a single piece. Wearable band 100 may be made of fabric configured to stretch allowing a user to slide wearable band 100 over a body part such as a hand or foot. Wearable band 100 may be configured as a wrist watch, a bracelet, a media player strap, a heart rate monitor, an anklet, a pedometer and/or the like.

Wearable band 100 comprises one or more touch sensing circuits 130. In one embodiment, one or more touch sensing circuits 130 are disposed on or below the outer surface of the wearable band 100. Touch sensing circuits 130 may be disposed beneath an outer exterior surface of wearable band 100 such as a leather, a cloth or a plastic covering consistent with any desirable style or fashion. In FIG. 1A, one or more touch sensing circuits 130 are disposed substantially across the length and width of wearable band 100. In another embodiment, for example, wearable band 100 depicted in FIG. 1B, one or more touch sensing circuits 130 are disposed on or below the surface of wearable band 100 in discrete areas across wearable band 100. Touch sensing circuits 130 may be disposed and distributed across wearable band 100 in any manner suitable for any of a wide variety of applications. For example, touch sensing circuits may be disposed on or below an outer surface of wearable band 100 as discrete virtual buttons each capable of determining one or more stationary or sliding finger touches. A finger touch may include a touch by any finger or thumb on either a left or a right hand. In another embodiment, touch sensing circuit 130 may be configured as discrete virtual buttons such that one or more discrete virtual buttons are capable of determining a sliding finger touch. Discrete virtual buttons may be disposed on wearable band 100 in any arrangement.

Electronic device 105 may comprise a controller 135 configured to receive signals from one or more touch sensing circuits disposed with touch sensitive band 100. In an example embodiment, "disposed with" means "disposed on", "disposed in" and/or "disposed under". When touch sensing circuit is activated, for example, when a user touches wearable band 100 with an object such as a finger or a thumb, a touch indication signal may be sent to controller 135.

Electronic device 105 may further comprise a wireless transmitter 140 capable of interpreting signals from controller 135 and transmitting signals to a receiver located remotely from electronic device 105. In another embodiment, electronic device 105 may further comprise a display 110. Electronic device 105 may comprise rim 125 along an outer edge of electronic device 105. Rim 125 may comprise one or more touch sensing circuits 165. Touch sensing circuits 165 may comprise one or more touch sensors 170. Touch sensor 170 may include but is not limited to any touch sensor previously described herein. Signals received from one or more touch sensing circuits 130 and/or one or more touch sensing circuits 165 may be interpreted by controller 135. Electronic device 105 may provide a function for a user of the touch sensitive wearable band as a result of signals received from one or more touch sensing circuits.

Touch sensing circuit 130 disposed with the surface of wearable band 100 may comprise one or more capacitive, resistive, or inductive touch sensors 160. Further, touch sensing circuit 165 disposed with rim 125 may comprise one or more capacitive, resistive, or inductive touch sensors 170. Touch sensor 160 and/or touch sensor 170 may be a capacitive touch sensor capable of being activated by capacitive coupling with a conductive touch object such as a user's finger or thumb. Example capacitive touch sensors and touch sensing circuits that may be used in touch sensing circuit 130 and/or touch sensing circuit 165 may include but are not limited to those disclosed in U.S. Pat. Nos. 4,103,252; 6,239,389; 5,650,597; 6,297,811; 7,439,962; 7,382,139 and 5,861,583. Example resistive touch sensors and touch sensing circuits that may be used in touch sensing circuit 130 and/or touch sensing circuit 165 may include but are not limited to those described in U.S. Pat. Nos. 4,755,634; 4,778,951 and 4,293,734 and International Publication WO/2007/141566. Any inductive touch sensors and touch sensing circuits may be used. Although a number of example capacitive, resistive and inductive touch sensors and touch sensing circuits disclosed may be used, in no way should the scope of the present invention be limited to these touch sensors and touch sensing circuits.

Capacitive touch sensors may include a wide variety of substrate materials such as cloth, plastic and/or the like. Substrate materials may include flexible materials to allow wearable band 100 to wrap around a body part such as a wrist or an arm. Further, touch sensor substrates comprising flexible materials can allow touch sensors to be configured in many different sizes, shapes and contours depending on the desired configuration of wearable band 100. For example, in one embodiment, touch sensors may comprise a flexible woven or unwoven fabric suitable to provide for flexibility and softness attributes of wearable band 100.

Figure 1C:
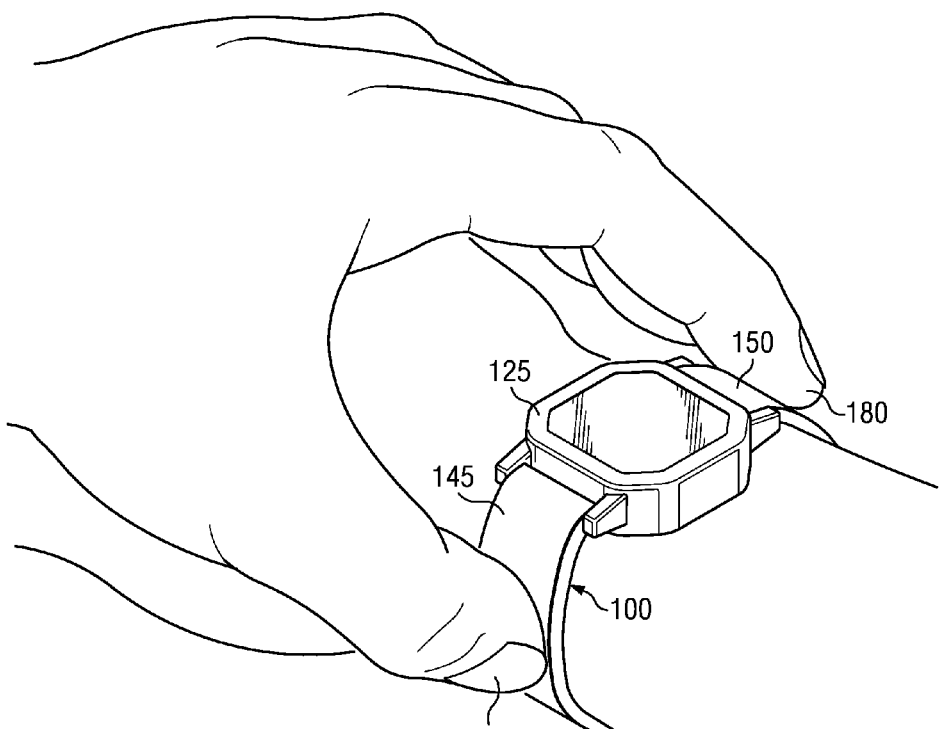
FIG. 1C schematically shows a first finger touch and a second finger touch on a touch sensitive wearable band.

FIG. 1C schematically shows a first finger touch and a second finger touch on touch sensitive wearable band 100. In one embodiment, first finger 175, for example, a thumb, touches bottom portion 145 of wearable band 100. First finger 175 may make a first stationary finger touch or a first sliding finger touch on wearable band 100. When a touch sensing circuit 130 senses a first touch by first finger 175 on wearable band 100, touch sensing circuit 130 may signal controller 135. Additionally, touch sensing circuit 130 may send an indication of a first touch area and/or location of first finger 175 on wearable band 100 to controller 135. Further, if a first finger touch is a sliding finger touch, touch sensing circuit 130 may send an indication of a first sliding finger direction to controller 135.

FIG. 1C shows second finger 180, for example, an index finger, touching top portion 150 of wearable band 100. In one embodiment, second finger 180 may make a second stationary finger touch on wearable band 100 or a second sliding finger touch on wearable band 100. When a touch sensing circuit 130 senses a second touch on wearable band 100 by second finger 180, touch sensing circuit 130 may signal controller 135. Additionally, touch sensing circuit 130 may send an indication of a touch area and/or location of second finger 180 to controller 135. Further, if a second finger touch is a sliding finger touch, touch sensing circuit 130 may send an indication of a second sliding finger direction to controller 135. Sliding finger touches may be made along a length or width of wearable band 100, for example, in either direction generally along an x-axis 120 or a y-axis 115.

In another embodiment, first finger 175 may make a first stationary finger touch on rim 125 or a first sliding finger touch on rim 125. When a touch sensing circuit 165 disposed with rim 125 senses a first touch by first finger 175, touch sensing circuit 130 may send a signal to controller 135. Additionally, touch sensing circuit 165 may send an indication of a first touch area and/or location of first finger 175 on rim 125 to controller 135. Further, if a first finger touch is a sliding finger touch, touch sensing circuit 165 may send an indication of a first sliding finger direction (e.g. clockwise or counter-clockwise) to controller 135. In one embodiment, second finger 180 may make a second stationary finger touch on rim 125 or a second sliding finger touch on rim 125. When a touch sensing circuit 165 senses a second touch by second finger 180 on rim 125, touch sensing circuit 130 may signal controller 135. Additionally, touch sensing circuit 165 may send an indication of a touch area and/or location of second finger 180 on rim 125 to controller 135. Further, if a second finger touch is a sliding finger touch on rim 125, touch sensing circuit 130 may send an indication of a second sliding finger direction to controller 135. Sliding finger touches along rim 125 of electronic device 105 may be clockwise or counter-clockwise.

Figure 2:
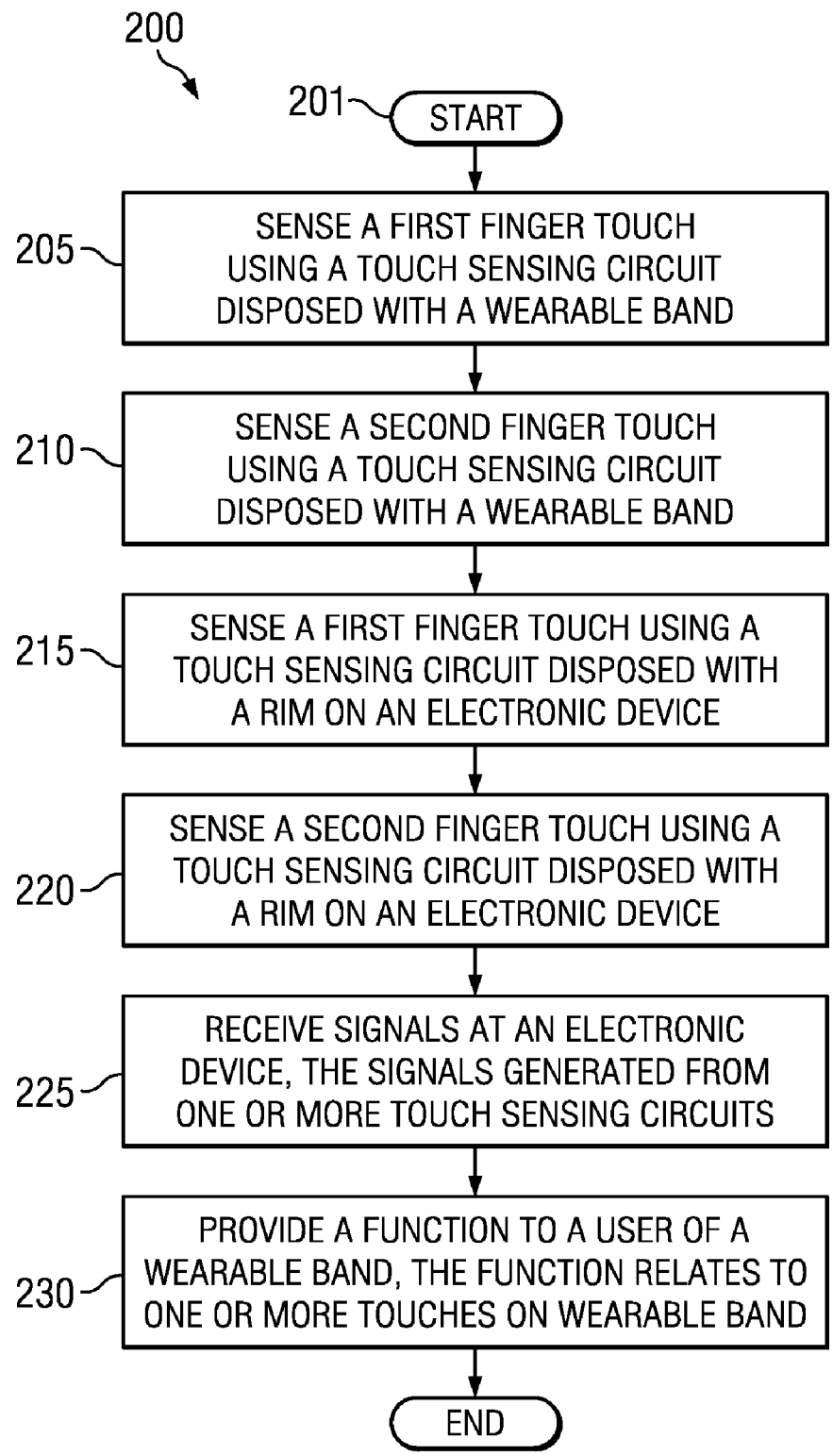
FIG. 2 is a flow diagram illustrating an example process for sensing one or more finger touches and providing a function to a user of a touch sensitive wearable band.

FIG. 2 is a flow diagram illustrating an example process 200 for sensing one or more finger touches 100 and providing an indication to a user of wearable band 100. Example process 200 may be performed, for example, using a wearable band 100 coupled with an electronic device 105 as shown in FIG. 1A or FIG. 1B. The process begins at 201 and continues to 205. At 205, a first finger touch may be sensed using touch sensing circuit 130 disposed with wearable band 100. At 210, a second finger touch may be sensed using touch sensing circuit 130 disposed with wearable band 100. Finger touches in 205 and 210 may be stationary finger touches or sliding finger touches. For example, a stationary finger touch or a first sliding finger touch may be sensed on top portion 150 or bottom portion 145 of wearable band. Finger touches may be sensed in any area or location on wearable band 100. Sliding finger touches may be made in any direction and may begin and end at any point on wearable band 100.

At 215, a first finger touch may be sensed using touch sensing circuit 165 disposed on rim 125. At 220, a second finger touch may also be sensed using touch sensing circuit 165. Finger touches at 215 and at 220 may be stationary finger touches or sliding finger touches. Stationary or sliding finger touches may be sensed in any area or location on rim 125 of electronic device 105. Sliding finger touches may be made either in clockwise or counter-clockwise directions on rim 125. Sliding finger touches may begin and end at any point on rim 125.

Additionally, a first finger touch may be a stationary finger touch on wearable band 100 and a second finger touch may be a sliding finger touch on wearable band 100. Also, a first finger touch may be a stationary finger touch on rim 125 and a second finger touch may be a sliding finger touch on rim 125.

At 225, signals from touch sensing circuit 130 and/or touch sensing circuit 165 may be received at electronic device 105 indicating one or more touches on wearable band 100 and/or on rim 125. Signals from touch sensing circuit 130 and/or touch sensing circuit 165 indicating one or more touches on wearable band 100 and/or on rim 125 may be in any form and may be specific to a particular touch sensing circuit design or implementation. At 230, a function relating the one or more touches may be provided to a user of wearable band 100. For example, controller 135 disposed with electronic device 105 may interpret signals from touch sensing circuit 130 and/or touch sensing circuit 165. Controller 135 may be configured to determine whether a touch is a stationary or sliding touch. Configuration of controller 135 may be specific to a particular design or implementation of touch sensing circuit 130 and/or touch sensing circuit 165 utilized. Controller may be configured to distinguish between signals originating from touch sensing circuit 130 and touch sensing circuit 165. If a stationary touch is received, for example, controller 135 may determine a location and/or an area of the touch on wearable band 100 and/or on rim 125 based on signals received from one or more touch sensing circuits. In one embodiment, controller 135 may be configured to compare, for example, a location of a stationary touch with a predetermined location on wearable band 100 and/or rim 125. For example, if a location of a stationary touch corresponds with a predetermined location, a function may be provided to a user of wearable band 100, for example, activating a background light. In another embodiment, controller 135 may be configured to determine the direction and/or area of a sliding finger touch on wearable band 100 and/or on rim 125. If a direction and/or location of a sliding finger touch corresponds with a predetermined direction and/or location, a function may be provided to a user of wearable band 100, such as scrolling through menus on display 110 or raising or lowering volume if electronic device 105 comprises, for example, a media player.

In another embodiment, controller 135 may be configured to receive signals from touch sensing circuit 130 or touch sensing circuit 165 corresponding with a first stationary or sliding finger touch and a second stationary or sliding finger touch on wearable band 100 and/or rim 135. For example, controller 135 may be configured to perform a function for a user of wearable band 100 when signals are received at electronic device 105 indicating a first finger touch and a second finger touch on wearable band 100. For example, one function that may be performed by controller 135 may include causing a display backlight to turn on or off. One benefit of configuring controller 135 to receive a first finger touch and a second finger touch before performing a function may be to limit or avoid receiving signals at electronic device 100 that may correspond to unintentional or erroneous finger touches.

Figure 1D:
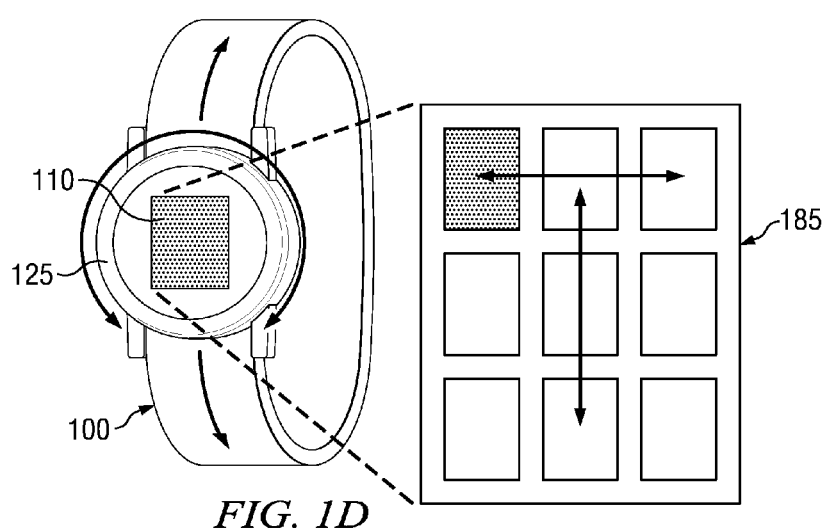
FIG. 1D schematically shows a menu scrolling function associated with signals received from one or more touch sensing circuits.

FIG. 1D schematically shows a menu scrolling function related to signals received from one or more touch sensing circuits. In one example embodiment, signals relating to a first sliding finger touch and a second sliding finger touch on wearable band 100 are received at controller 135. Upon receiving signals indicating both a first sliding finger touch and a second sliding finger touch in one direction on wearable band 100, controller 135 may cause display 110 to scroll vertically in one direction through two-dimensional array of screens 185. Similarly, when signals are received at controller 135 indicating a first sliding finger touch and a second sliding finger touch both in the opposite direction on wearable band 100, controller 135 may cause display 110 to scroll vertically in the opposite direction through a two-dimensional array of screens 185. In an another example embodiment, signals relating to a first sliding finger touch and a second sliding finger touch on rim 125 are received at controller 135. Upon receiving signals indicating both the first sliding finger touch and the second sliding finger touch in a clockwise direction, for example, along rim 125, controller 135 may cause display 110 to scroll horizontally in one direction through two-dimensional array of screens 185. Similarly, when signals are received at controller 135 indicating a first sliding finger touch and a second sliding finger touch both in a counter-clockwise direction along rim 125, controller 135 may cause display 110 to scroll horizontally in the opposite direction through a two-dimensional array of screens 185.

Without in any way limiting the scope, interpretation, or application of the claims appearing below, a technical effect of one or more of the example embodiments disclosed herein may be to provide a particular function to a user of a touch sensitive wearable band such as scrolling through a list of menu items on display 110 based at least in part on one or more stationary or sliding finger touches on wearable band 100 and/or on rim 125.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
   a touch sensitive wearable band having a first touch sensing circuit; and
   an electronic device configured to receive signals generated from said first touch sensing circuit to provide a function for a user of said touch sensitive wearable band, said electronic device being electrically coupled with said touch sensitive wearable band.

2. The apparatus of claim 1, wherein said first touch sensing circuit is configured to sense a first stationary finger touch location along a surface of said wearable band, wherein said signals comprise an indication of said first stationary finger touch location.

3. The apparatus of claim 2, wherein said first touch sensing circuit is further configured to sense a first sliding finger touch direction along said surface of said wearable band, wherein said signals further comprise an indication of said first sliding finger touch direction.

4. The apparatus of claim 2, wherein said first touch sensing circuit is further configured to sense a second stationary finger touch location along said surface of said wearable band, wherein said signals further comprise an indication of said second stationary finger touch location.

5. The apparatus of claim 4, wherein said touch-sensing circuit is configured to measure capacitance.

6. The apparatus of claim 4, wherein said touch-sensing circuit is configured to measure resistance.

7. The apparatus of claim 4, wherein said touch-sensing circuit is configured to measure inductance.

8. The apparatus of claim 4, further comprising a display connected with said electronic device.

9. The apparatus of claim 4, further comprising a wireless transmitter is connected with said electronic device.

10. The apparatus of claim 1, wherein said first touch sensing circuit is configured to sense a first sliding finger touch direction along a surface of said wearable band, wherein said signals further comprise an indication of said first sliding finger touch direction.

11. The apparatus of claim 10, wherein said first touch sensing circuit is further configured to sense a second sliding finger touch direction along said surface of said wearable band, wherein said signals further comprise an indication of said second sliding finger touch direction.

12. The apparatus of claim 1, wherein said electronic device includes a second touch-sensing circuit disposed on a rim of said electronic device.

13. The apparatus of claim 12, wherein said second touch sensing circuit is configured to sense a first stationary finger touch location along said rim, wherein said signals comprise an indication of said first stationary finger touch location.

14. The apparatus of claim 13, wherein said second touch sensing circuit is further configured to sense a first sliding finger touch direction along said rim, wherein said signals further comprise an indication of said first sliding finger touch direction.

15. The apparatus of claim 13, wherein said second touch sensing circuit is further configured to sense a second stationary finger touch location along said rim, wherein said signals further comprise an indication of said second stationary finger touch location.

16. The apparatus of claim 12, wherein said second touch sensing circuit is configured to sense a first sliding finger touch direction along said rim, wherein said signals further comprise an indication of said first sliding finger touch direction.

17. The apparatus of claim 16, wherein said second touch sensing circuit is further configured to sense a second sliding finger touch direction along said rim, wherein said signals further comprise an indication of said second sliding finger touch direction.

18. A method comprising:
configuring an electronic device to receive signals generated from a first touch sensing circuit to provide a function for a user of a touch sensitive wearable band, said electronic device being electrically coupled with said touch sensitive wearable band.

19. The method of claim 18, wherein said first touch sensing circuit is configured to sense a first stationary finger touch location along a surface of said wearable band, wherein said signals comprise an indication of said first stationary finger touch location.

20. The method of claim 19, wherein said first touch sensing circuit is further configured to sense a first sliding finger touch direction along said surface of said wearable band, wherein said signals further comprise an indication of said first sliding finger touch direction.

21. The method of claim 19, wherein said first touch sensing circuit is further configured to sense a second stationary finger touch location along said surface of said wearable band, wherein said signals further comprise an indication of said second stationary finger touch location.

22. The method of claim 18, wherein said first touch sensing circuit is configured to sense a first sliding finger touch direction along a surface of said wearable band, wherein said signals further comprise an indication of said first sliding finger touch direction.

23. The method of claim 22, wherein said first touch sensing circuit is further configured to sense a second sliding finger touch direction along said surface of said wearable band, wherein said signals further comprise an indication of said second sliding finger touch direction.

24. A method comprising:
sensing a first touch using a first touch sensing circuit, wherein said first touch sensing circuit disposed with a touch sensitive wearable band;
receiving signals at an electronic device, wherein said signals generated from said first touch sensing circuit; and
providing a function to a user of said touch sensitive wearable band, wherein said function relates to said first touch.

\* \* \* \* \*